United States Patent
Yamada

(10) Patent No.: US 10,715,030 B2
(45) Date of Patent: Jul. 14, 2020

(54) POWER CONVERTER HAVING AN INPUT-SIDE CONVERTER AND FIRST AND SECOND OUTPUT-SIDE CONVERTERS

(71) Applicant: Fuji Electric Co., Ltd., Kanagawa (JP)

(72) Inventor: Ryuji Yamada, Tokyo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 16/377,101

(22) Filed: Apr. 5, 2019

(65) Prior Publication Data

US 2019/0348903 A1    Nov. 14, 2019

(30) Foreign Application Priority Data

May 9, 2018   (JP) .................................. 2018-090630

(51) Int. Cl.
 *H02M 1/14*    (2006.01)
 *H02M 7/217*   (2006.01)
 *H02M 1/00*    (2006.01)

(52) U.S. Cl.
 CPC ............. *H02M 1/14* (2013.01); *H02M 7/217* (2013.01); *H02M 2001/007* (2013.01); *H02M 2001/0009* (2013.01)

(58) Field of Classification Search
 CPC ........ H02M 1/14; H02M 1/15; H02M 1/4225; H02M 7/06; H02M 7/217; H02M 2001/007; H02M 2001/0009

USPC ........................................... 363/44–46, 56.02
 See application file for complete search history.

(56) References Cited

U.S. PATENT DOCUMENTS

| 8,760,128 B2 * | 6/2014 | Xu ...................... H02M 1/4216 323/207 |
| 9,461,560 B2 * | 10/2016 | Inoue ..................... H02M 7/217 |
| 9,997,994 B1 * | 6/2018 | Luo ..................... H02M 1/4233 |
| 2003/0035305 A1 * | 2/2003 | Arai ........................ H02M 3/28 363/17 |
| 2009/0027930 A1 * | 1/2009 | Usui ................... H02M 1/4225 363/84 |
| 2009/0027931 A1 * | 1/2009 | Usui ....................... H02J 9/061 363/84 |
| 2017/0166069 A1 * | 6/2017 | Jojima .................... B60L 50/51 |
| 2017/0222545 A1 * | 8/2017 | Haga ....................... H02M 1/08 |
| 2018/0262045 A1 * | 9/2018 | Ohnishi ............... H02M 5/4585 |

FOREIGN PATENT DOCUMENTS

JP    H9-107681 A    4/1997

* cited by examiner

*Primary Examiner* — Yemane Mehari
(74) *Attorney, Agent, or Firm* — Chen Yoshimura LLP

(57) ABSTRACT

A power converter includes: an input-side converter including a positive-side capacitor arranged between a positive terminal and a neutral terminal as well as a negative-side capacitor arranged between a negative terminal and the neutral terminal; a first converter connected to the positive terminal and the neutral terminal; and a second converter, an input side thereof being connected to the negative terminal and the neutral terminal, with the input side also being connected in series to the first converter, and the output side thereof being connected in parallel to the first converter.

11 Claims, 8 Drawing Sheets

POWER CONVERTER HAVING AN INPUT-SIDE CONVERTER AND FIRST AND SECOND OUTPUT-SIDE CONVERTERS

BACKGROUND OF THE INVENTION

Technical Field

The present invention relates to a power converter including a positive-side capacitor and a negative-side capacitor.

Background Art

Power converters that include a positive-side capacitor and a negative-side capacitor are conventionally well-known (see Patent Document 1, for example).

Patent Document 1 discloses a DC uninterruptible power supply (hereinafter, "power supply") including a first capacitor and a second capacitor which are connected in series. This power supply includes a plurality of diodes and a plurality of semiconductor switches. Moreover, in this power supply, the plurality of diodes and the plurality of semiconductor switches are used to convert AC power input from an AC power supply into DC power. In addition, this power supply is configured such that output from a P-terminal and an M-terminal which are the terminals on both sides of the first capacitor is output as the positive DC output and such that output from the M-terminal and an N-terminal which are the terminals on both sides of the second capacitor is output as the negative DC output. In other words, this power supply is configured as a three-level power supply in which the respective output voltage values (levels) of the P-terminal, the M-terminal, and the N-terminal are different.

RELATED ART DOCUMENTS

Patent Documents

Patent Document 1: Japanese Patent Application Laid-Open Publication No. H9-107681

SUMMARY OF THE INVENTION

In a conventional DC uninterruptible power supply (power converter) of the type disclosed in Patent Document 1, three-phase AC power is sometimes input as the input AC power. In this case, current obtained by half-wave rectifying the input three-phase AC current flows into each of the first capacitor and the second capacitor. In other words, current having a waveform that includes ripple components (ripple) mixed in from the positive-side current waveform of each phase of the three-phase AC flows into the first capacitor, and current having a waveform that includes ripple components (ripple) mixed in from the negative-side current waveform of each phase of the three-phase AC flows into the second capacitor. This is to say that current containing ripple components of a frequency three times the input frequency of the three-phase AC constantly flows into the first capacitor and the second capacitor. Due to the inflow of this current that includes ripple components, the voltage imbalance between the voltage difference across the terminals of the first capacitor and the voltage difference across the terminals of the second capacitor increases. In other words, the imbalance between the voltages output at the positive DC output and the negative DC output increases. As a result, in order to reduce this imbalance, it is necessary to make the capacitance of the first capacitor and the second capacitor relatively large.

However, capacitors that have relatively high capacitance (such as electrolytic capacitors) typically have a short component lifespan in comparison with other components. Therefore, if the first capacitor and the second capacitor are not configured to be replaceable components, the component lifespans of the first capacitor and the second capacitor become the lifespan of the power converter. Moreover, if the first capacitor and the second capacitor are configured to be replaceable components, the frequency at which the first capacitor and the second capacitor must be replaced increases. As a result, to date there has been demand for a power converter that makes it possible to mitigate such shortening of the lifespans of the first capacitor (positive-side capacitor) and the second capacitor (negative-side capacitor) while still reducing the output voltage imbalance caused by current that contains ripple flowing through the first capacitor and the second capacitor.

The present invention was made to solve the abovementioned problems, and one object of the present invention is to provide a power converter that makes it possible to mitigate shortening of the lifespans of a positive-side capacitor and a negative-side capacitor.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a power converter, including: an input-side converter circuit including: a DC output terminal section having a positive terminal, a negative terminal, and a neutral terminal; a positive-side capacitor, one end of which is connected to the positive terminal through a positive node and another end of which is connected to the neutral terminal through a neutral node; and a negative-side capacitor, one end of which is connected to the neutral terminal through the neutral node and another end of which is connected to the negative terminal through a negative node; a first output-side converter circuit having first and second input terminals, the first input terminal being connected to the positive node and the second input terminal being connected to the neutral node, the first output-side converter circuit further having two output terminals, respectively connected to two main output terminals of the power converter; and a second output-side converter circuit having first and second input terminals, the first input terminal being connected to the neutral node and the second input terminal being connected to the negative node so that the first and second input terminals of the first output-side converter circuit and the first and second input terminals of the second output-side converter circuit are connected in series, the second output-side converter circuit further having two output terminals, respectively connected to the two main output terminals of the power converter so that the two output terminals of the first output-side converter circuit and the two output terminals of the second output-side converter circuit are connected in parallel to each other.

In this power converter according to the one aspect of the present invention, as described above, the power converter includes the first output-side converter circuit and the second output-side converter circuit, the input sides thereof being connected together in series and the output sides thereof being connected together in parallel. Thus, on the input sides of the first output-side converter circuit and the second output-side converter circuit, currents having mutually different current waveforms can be passed, and on the output side, a current in which these waveforms are combined can be passed (output). Therefore, by controlling the operation of the first output-side converter circuit such that a ripple component is contained in the current waveform flowing into the input side of the first output-side converter circuit, the ripple component in the current flowing from the positive terminal to the first output-side converter circuit and the positive-side capacitor can be made to flow into the first output-side converter circuit instead of the positive-side capacitor. In other words, current in which the ripple component on the input-side converter circuit side has been canceled out by the ripple component on the first output-side converter circuit side flows into the positive-side capacitor, thereby making it possible to reduce the ripple component in the current flowing into the positive-side capacitor. Meanwhile, by controlling the operation of the second output-side converter circuit such that a ripple component is contained in the current waveform that flows into the input side of the second output-side converter circuit, the ripple component in the current that flows into the negative-side capacitor can be reduced similarly to in the positive-side capacitor. Reducing these ripple components eliminates the need to increase the capacitance of the positive-side capacitor and the negative-side capacitor, thereby making it possible to mitigate lifespan shortening. This makes it possible to use capacitors other than electrolytic capacitors with relatively short lifespans for the positive-side capacitor and the negative-side capacitor, for example, thereby making it possible to mitigate lifespan shortening. In addition, capacitors that have relatively large capacitance are typically large in size. However, in the present invention, to the extent that the capacitance of the positive-side capacitor and the negative-side capacitor does not need to be increased, increases in the size of the positive-side capacitor and the negative-side capacitor can be avoided. Furthermore, the phase of the ripple component in the current waveform on the input side of the first output-side converter circuit and the phase of the ripple component in the current waveform on the input side of the second output-side converter circuit are different by 180° (the polarity is inverted), and therefore these ripple components get cancelled out on the output side of the first output-side converter circuit and the second output-side converter circuit. Thus, on the output side of the first output-side converter circuit and the second output-side converter circuit, it is possible to output the output power in a state in which ripple components have been reduced as a result of the waveforms being combined. As a result of these effects, shortening of the lifespans of the positive-side capacitor and the negative-side capacitor can be mitigated.

In the power converter according to the aspect described above, the power converter may be configured such that a current having a ripple component flows from the positive terminal to the first input terminal of the first output-side converter circuit and a current having a ripple component flows from the second input terminal of the second output-side converter circuit to the negative terminal, and the power converter may be configured such that a current in which the ripple components are cancelled out with each other at least partially flows between the two main output terminals of the power converter through the load when the two main output terminals are connected to the load. Due to this configuration, in the positive-side capacitor, the ripple component in the current that flows from the positive terminal towards the positive-side capacitor and the input side of the first output-side converter circuit flows towards the first output-side converter circuit side instead of the positive-side capacitor side, thereby making it possible to effectively reduce the ripple component in the current that flows through the positive-side capacitor. Furthermore, in the negative-side capacitor, the ripple component can also be effectively reduced similarly to in the positive-side capacitor.

In the power converter according to the aspect described above, the two output terminals of the first output-side converter circuit may be positive and negative output terminals, respectively, and the two output terminals of the second output-side converter circuit may be positive and negative output terminals, respectively, and the positive output terminal of the first output-side converter circuit and the positive output terminal of the second output-side converter circuit may be connected to each other to constitute a positive output terminal of the power converter, and the negative output terminal of the first output-side converter circuit and the negative output terminal of the second output-side converter circuit may be connected to each other to constitute a negative output terminal of the power converter. As a result, in the positive-side capacitor, the ripple component in the current that flows from the positive terminal towards the positive-side node flows from the positive-side node towards the first output-side converter circuit side instead of from the positive-side node towards the positive-side capacitor side, thereby making it possible to more effectively reduce the ripple component in the current that flows through the positive-side capacitor. Furthermore, in the negative-side capacitor, the ripple component can also be more effectively reduced similarly to in the positive-side capacitor.

In this case, the first output-side converter circuit may be controlled such that a first adjusted current flows from the positive node to the first input terminal of the first output-side converter circuit, the first adjusted current having a ripple component corresponding to a ripple component of a first current that flows from the positive terminal to the positive node, and the second output-side converter circuit may be controlled such that a second adjusted current flows from the second input terminal of the second output-side converter circuit to the negative node, the second adjusted current having a ripple component corresponding to a ripple component of a second current that flows from the negative node to the negative terminal. Due to this configuration, the first adjusted current and the second adjusted current can be generated in accordance with the ripple component in the first current and the ripple component in the second current so as to reduce the ripple components in the currents that flow into the positive-side capacitor and the negative-side capacitor, and therefore even when the waveforms of the ripple component in the first current and the ripple component in the second current change, the ripple component in the current that flows from the positive-side node to the positive-side capacitor and the ripple component in the current that flows from the negative-side capacitor to the negative-side node can still be reduced.

The above-mentioned power converter may further includes an output voltage detector that detects an output voltage between the two main output terminals of the power converter; a first adjusted current detector that detects the first adjusted current; a second adjusted current detector that detects the second adjusted current; a ripple component obtaining unit that obtains the ripple component of the first current and the ripple component of the second current; and a controller that controls the first output-side converter circuit and the second output-side converter circuit on the basis of the detected output voltage, the detected first adjusted current, the detected second adjusted current, the obtained ripple component of the first current, and the obtained ripple component of the second current so that the ripple component of the first adjusted current corresponds to the ripple component of the first current that flows from the positive terminal to the positive node and so that the ripple component of the second adjusted current corresponds to the ripple component of the second current that flows from the negative node to the negative terminal. This configuration makes it possible to, on the basis of the detected output voltage value, first adjusted current, and second adjusted current as well as the obtained ripple component in the first current and ripple component in the second current, generate a first adjusted current and a second adjusted current that are capable of appropriately reducing the ripple component in the current flowing through the positive-side capacitor and the ripple component in the current flowing through the negative-side capacitor.

In the power converter described above that includes the controller, the controller may add the obtained ripple component of the first current to a base current command value to generate a first current command value for the first output-side converter circuit and may generate a first control signal for causing the first adjusted current to match the first current command value, and may subtract the obtained ripple component of the first current from the base current command value to generate a second current command value for the second output-side converter circuit and may generate a second control signal for causing the second adjusted current to match the second current command value. In this configuration, using the first control signal and the second control signal, the first adjusted current and the second adjusted current can be periodically updated so as to take appropriate waveforms, and therefore even if the magnitudes of the ripple components fluctuate, the ripple component in the current flowing through the positive-side capacitor and the ripple component in the current flowing through the negative-side capacitor can still be appropriately reduced.

In the power converter described above that includes the ripple component obtaining unit, the ripple component obtaining unit may include an AC input detector that detects an input voltage and an input current of an AC input power that is inputted to the input-side converter circuit, and may calculate the ripple component of the first current and the ripple component of the second current on the basis of the input voltage and the input current detected by the AC input detector.

In the power converter described above that includes the ripple component obtaining unit, the ripple component obtaining unit may include a first voltage detector that detects a first voltage across the positive-side capacitor and a second voltage detector that detects a second voltage across the negative-side capacitor, and may calculate the ripple component of the first current and the ripple component of the second current on the basis of the first voltage and the second voltage detected by the first voltage detector and the second voltage detector, respectively. Here, in general, voltage difference detectors can be configured to be smaller in size than detectors for detecting current (current detectors). In this regard, in the present invention the ripple component in the first current and the ripple component in the second current are obtained on the basis of the first voltage difference and the second voltage difference detected by the voltage difference detector, which in comparison to detecting the ripple components using current detectors that detect the first current and the second current directly, makes it possible to avoid an increase in the size of the ripple component obtaining unit.

In the power converter described above that includes the ripple component obtaining unit, the ripple component obtaining unit may include a first current detector that detects the first current and a second current detector that detects the second current, and may determine the ripple component of the first current and the ripple component of the second current on the basis of the first current and the second current detected by the first current detector and the second current detector, respectively. In this configuration, the ripple component in the first current and the ripple component in the second current can be detected (obtained) directly by the first current detector and the second current detector, thereby making it possible to obtain the ripple components more accurately than when estimating (calculating) the ripple components from other physical quantities.

In the power converter described above that includes the ripple component obtaining unit, the controller may control the first output-side converter circuit and the second output-side converter circuit to generate the first adjusted current and the second adjusted current such that a current flowing across the positive-side capacitor between the positive node and the neutral node does not include the ripple component of the first current flowing from the positive terminal to the positive node or contains a substantially reduced amount of the ripple component of the first current, and such that a current flowing through the negative-side capacitor between the neutral node and the negative node does not include the ripple component of the second current flowing from the negative node to the negative terminal or contains a substantially reduced amount of the ripple component of the second current. In another aspect, the present disclosure provides a power converter, including: an input-side converter circuit configured to receive an AC power input, the input-side converter including: a DC output terminal section having a positive terminal, a negative terminal, and a neutral terminal; a positive-side capacitor, one end of which is connected to the positive terminal through a positive node and another end of which is connected to the neutral terminal through a neutral node; and a negative-side capacitor, one end of which is connected to the neutral terminal through the neutral node and another end of which is connected to the negative terminal through a negative node; a first output-side converter circuit having first and second input terminals, the first input terminal being connected to the positive node and the second input terminal being connected to the neutral node, the first output-side converter circuit further having two output terminals, respectively connected to two main output terminals of the power converter; a second output-side converter circuit having first and second input terminals, the first input terminal being connected to the neutral node and the second input terminal being connected to the negative node so that the first and second input terminals of the first output-side converter circuit and the first and second input terminals of the second output-side converter circuit are connected in series, the second output-side converter circuit further having two output terminals, respectively connected to the two main output terminals of the power converter so that the two output terminals of the first output-side converter circuit and the two output terminals of the second output-side converter circuit are connected in parallel to each other; and a controller that controls the first output-side converter circuit and the second output-side converter circuit, wherein the controller controls the first output-side converter circuit such that a first adjusted current flows from the positive node to the first input terminal of the first output-side converter circuit, the first adjusted current having a ripple component corresponding to a ripple component of a first current that flows from the positive terminal to the positive node so that a current flowing across the positive-side capacitor between the positive node and the neutral node does not include the ripple component of the first current or contains a substantially reduced amount of the ripple component of the first current, and wherein the controller controls the second output-side converter circuit such that a second adjusted current flows from the second input terminal of the second output-side converter circuit to the negative node, the second adjusted current having a ripple component corresponding to a ripple component of a second current that flows from the negative node to the negative terminal so that a current flowing through the negative-side capacitor between the neutral node and the negative node does not include the ripple component of the second current or contains a substantially reduced amount of the ripple component of the second current.

As described above, the present invention makes it possible to mitigate shortening of the lifespans of the positive-side capacitor and the negative-side capacitor.

It is to be understood that both the foregoing general description and the following detailed description are exemplary and explanatory, and are intended to provide further explanation of the invention as claimed.

DETAILED DESCRIPTION OF EMBODIMENTS

Specific embodiments of the present invention will be described below with reference to figures.

Embodiment 1

(Configuration of Power Converter)

The configuration of a power converter 100 according to Embodiment 1 of the present invention will be described with reference to FIGS. 1 to 6.

Figure 1:
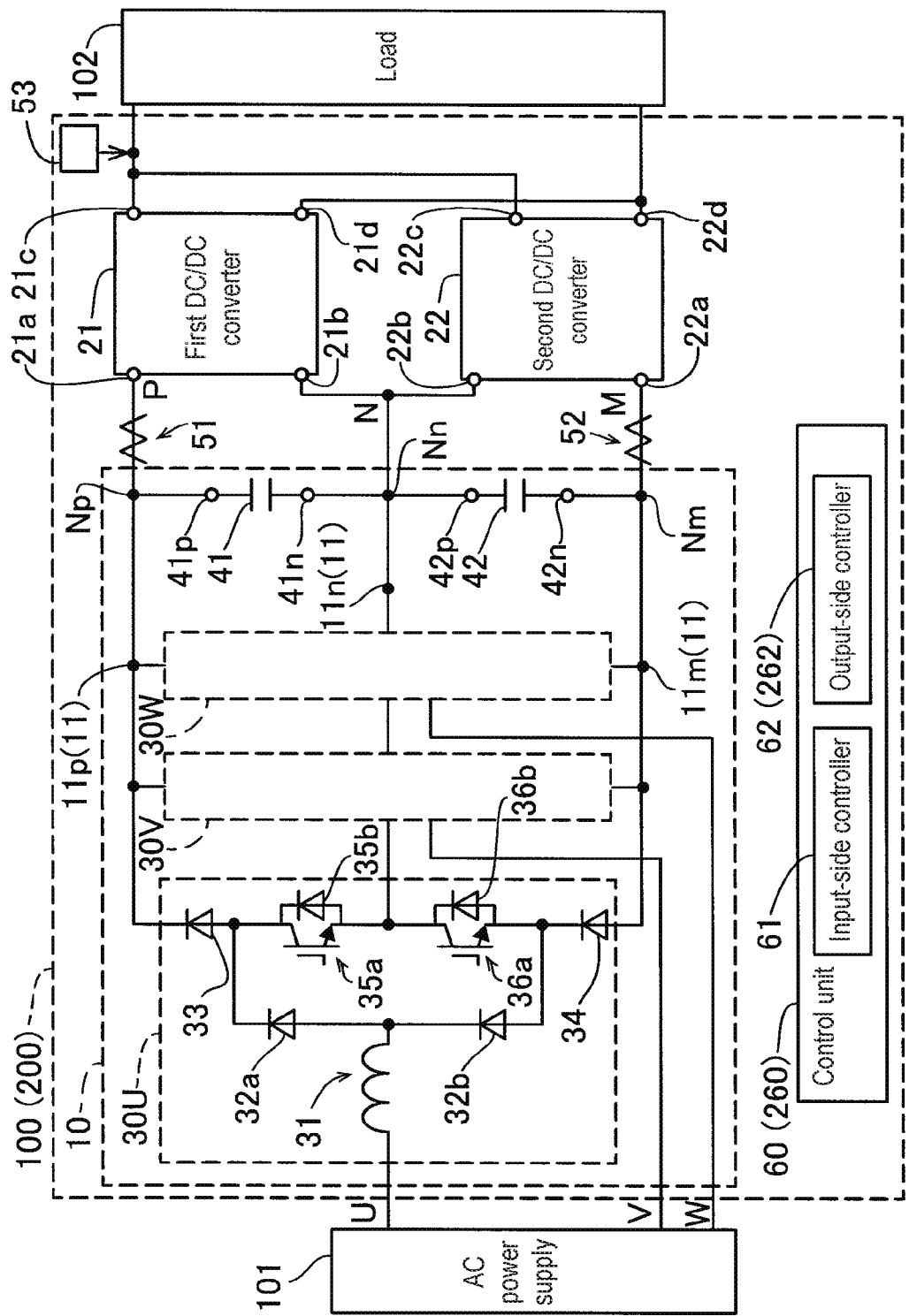
FIG. 1 is a block diagram illustrating the configuration of a power converter according to Embodiments 1 and 2 of the present invention.

As illustrated in FIG. 1, the power converter 100 is configured as an AC input/DC output (AC/DC) converter that converts three-phase AC power (input power) from an AC power supply 101 into DC power, for example. Moreover, the power converter 100 is configured to output the DC power (output power) to a load 102. For example, the power converter 100 is configured as an AC/DC isolated power supply for a data center or the like. Furthermore, the power converter 100 is configured as a rectifier that utilizes power factor correction (PFC). For example, the AC power supply 101 is configured to output three-phase balanced AC current.

In addition, the power converter 100 includes an input-side AC/DC converter circuit 10 (hereinafter, an "input-side converter 10"), a first DC/DC converter circuit 21 (hereinafter, a "first converter 21"), and a second DC/DC converter circuit 22 (hereinafter, a "second converter 22"). Here, the input-side AC/DC converter circuit 10 is an example of an "input-side converter circuit". Moreover, the first converter 21 is an example of a "first output-side converter circuit". Similarly, the second converter 22 is an example of a "second output-side converter circuit".

<Configuration of Input-Side Converter>

Figure 2:
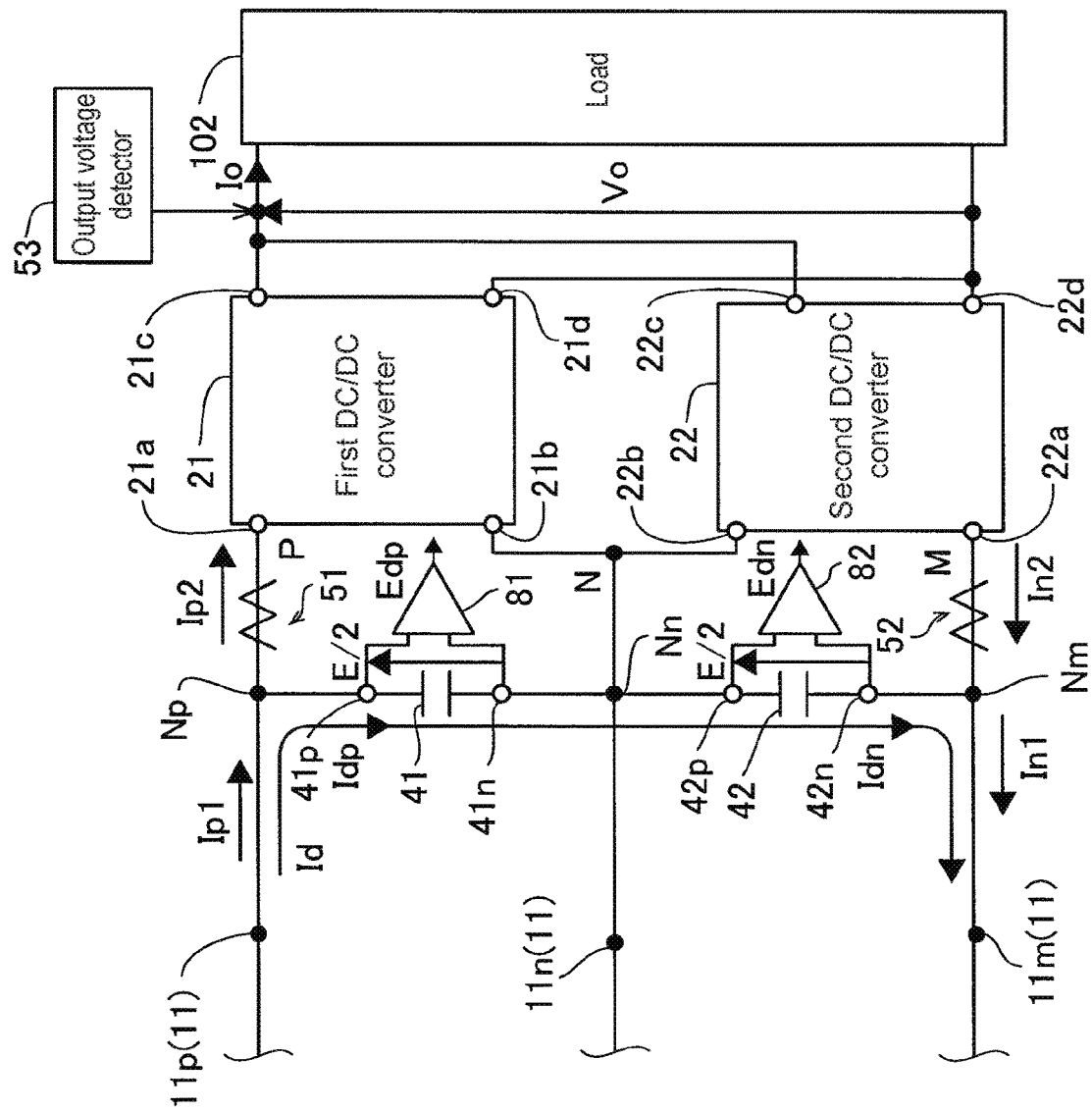
FIG. 2 is a block diagram illustrating the configuration of a portion of the power converter according to Embodiments 1 and 2 of the present invention.

The input-side converter 10 is configured as a three-level AC/DC converter. More specifically, as illustrated in FIG. 2, the input-side converter 10 includes a DC output terminal section 11 having a positive terminal 11p, a negative terminal 11m, and a neutral terminal 11n. The voltage difference between the positive terminal 11p and the neutral terminal 11n is E/2, the voltage difference between the neutral terminal 11n and the negative terminal 11m is E/2, and the voltage difference between the positive terminal 11p and the negative terminal 11m is E.

Moreover, as illustrated in FIG. 1, the input-side converter 10 includes a U-phase power converter 30U, a V-phase power converter 30V, a W-phase power converter 30W, a positive-side capacitor 41, and a negative-side capacitor 42. The U-phase power converter 30U (V-phase power converter 30V, W-phase power converter 30W) is configured to rectify the U-phase (V-phase, W-phase) AC power input from the AC power supply 101 and output the resulting rectified power.

The U-phase power converter 30U includes a reactor 31 with one end connected to the AC power supply 101, diodes 32a and 32b connected to the other end of the reactor 31, a diode 33 arranged between the diode 32a and the positive terminal 11p, a diode 34 arranged between the diode 32b and the negative terminal 11m, a switching device 35a arranged between the diode 33 and the neutral terminal 11n, a diode 35b connected in anti-parallel to the switching device 35a, a switching device 36a arranged between the diode 34 and the neutral terminal 11n, and a diode 36b connected in anti-parallel to the switching device 36a. The V-phase power converter 30V and the W-phase power converter 30W are configured similarly to the U-phase power converter 30U and therefore will not be described here.

It is preferable that the positive-side capacitor 41 and the negative-side capacitor 42 be constituted by capacitors that do not use an electrolytic solution. For example, the positive-side capacitor 41 and the negative-side capacitor 42 are constituted by capacitors other than electrolytic capacitors such as tantalum capacitors, ceramic capacitors, or film capacitors.

The positive-side capacitor 41 is arranged between the positive terminal 11p and the neutral terminal 11n. In addition, the negative-side capacitor 42 is arranged between the negative terminal 11m and the neutral terminal 11n. More specifically, a positive terminal 41p of the positive-side capacitor 41 is connected to the positive terminal 11p via a positive-side node (positive node) Np. A negative terminal 41n of the positive-side capacitor 41 is connected to the neutral terminal 11n via a neutral node Nn. Furthermore, a positive terminal 42p of the negative-side capacitor 42 is connected to the neutral terminal 11n via the neutral node Nn. A negative terminal 42n of the negative-side capacitor 42 is connected to the negative terminal 11m via a negative-side node (negative node) Nm.

Here, as illustrated in FIG. 2, a first current that flows from the positive terminal 11p to the positive-side node Np is Ip1, and a current that flows from the positive-side node Np to the positive-side capacitor 41 is Idp. Moreover, a second current that flows from the negative-side node Nm to the negative terminal 11m is In1, and a current that flows from the negative-side capacitor 42 to the negative-side node Nm is Idn.

<Configuration of First Converter and Second Converter>

The first converter 21 and the second converter 22 are respectively configured as isolated DC/DC converters in which the input side and the output side are isolated. Here, the first converter 21 and the second converter 22 may respectively be configured as various types of converters. For example, the first converter 21 and the second converter 22 may be configured as any type of converter among LLC resonant converters, phase-shift converters, forward converters, and flyback converters.

Moreover, as illustrated in FIG. 1, in Embodiment 1 the first converter 21 is connected to the positive terminal 11p and the neutral terminal 11n. Furthermore, the input side of the second converter 22 is connected to the negative terminal 11m and the neutral terminal 11n. This input side is also connected in series to the first converter 21, and the output side is connected in parallel to the first converter 21.

More specifically, in the first converter 21, an input-side terminal 21a is connected to the positive-side node Np that connects the positive terminal 11p and the positive-side capacitor 41, and an input-side terminal 21b is connected to the neutral terminal 11n. In the second converter 22, an input-side terminal 22a on the input side is connected to the negative-side node Nm that connects the negative terminal 11m and the negative-side capacitor 42, and an input-side terminal 22b on the input side is connected to the neutral terminal 11n. Here, the input-side terminal 21a is an example of a "first one-side input terminal". Moreover, the input-side terminal 21b is an example of a "first other-side input terminal". Similarly, the input-side terminal 22a is an example of a "second one-side input terminal". Furthermore, the input-side terminal 22b is an example of a "second other-side input terminal".

In addition, due to an output-side terminal 21c on the positive side of the first converter 21 and an output-side terminal 22c on the positive side of the second converter 22 being connected together as well as an output-side terminal 21d on the negative side of the first converter 21 and an output-side terminal 22d on the negative side of the second converter 22 being connected together, the input side of the first converter 21 and the input side of the second converter 22 are connected in series, and the output side of the first converter 21 and the output side of the second converter 22 are connected in parallel. Here, the output-side terminals 21c and 22c are examples of "positive output-side terminals". Moreover, the output-side terminals 21d and 22d are examples of "negative output-side terminals".

Figure 3:
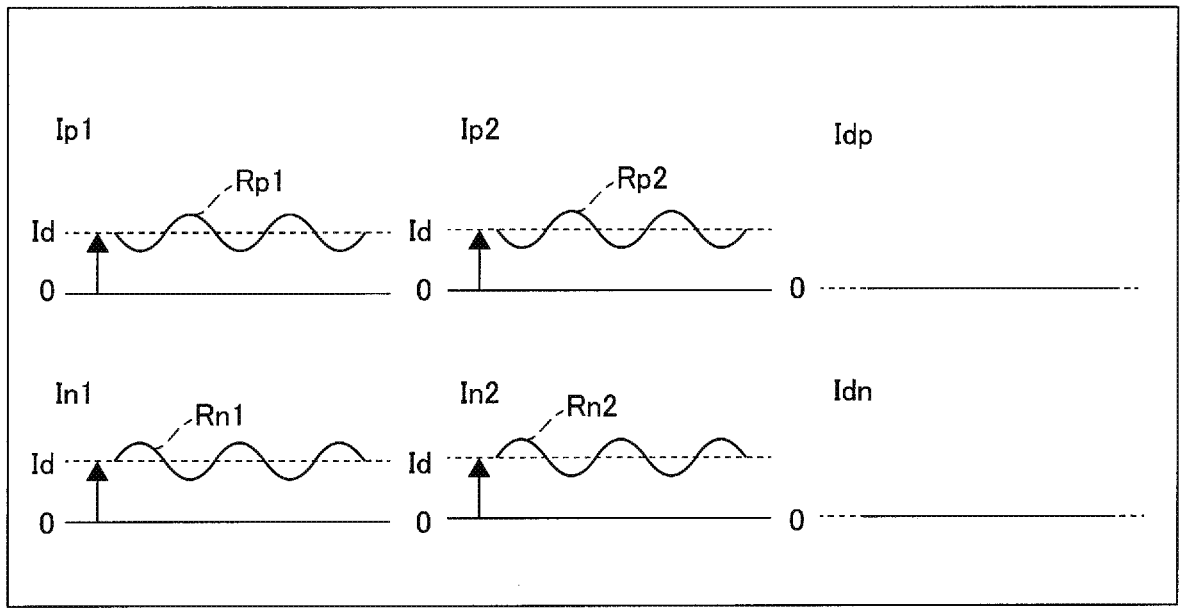
FIG. 3 illustrates the waveforms of a first current, a second current, a first adjusted current, and a second adjusted current in a power converter according to Embodiments 1 to 3 of the present invention.

Here, as illustrated in FIGS. 2 and 3, Embodiment 1 is configured such that a first adjusted current Ip2 having a ripple component Rp2 flows from the positive terminal 11p to the input side of the first converter 21 and such that a second adjusted current In2 having a ripple component Rn2 flows from the input side of the second converter 22 to the negative terminal 11m. Moreover, Embodiment 1 is configured such that an output current Io in which at least one of the ripple component Rp2 and the ripple component Rn2 has been canceled out flows from the output side of the first converter 21 and the output side of the second converter 22 to the load 102. Furthermore, the voltage value (output voltage value) of the power output to the load 102 from the output side of the first converter 21 and the output side of the second converter 22 is Vo.

<Configuration for Controlling First Converter and Second Converter>

As illustrated in FIG. 3, in Embodiment 1 the first converter 21 is configured such that the first adjusted current Ip2 having the ripple component Rp2 corresponding to a ripple component Rp1 in the first current Ip1 flowing from the positive terminal 11p to the positive-side node Np is controlled so as to flow from the positive-side node Np to the input-side terminal 21a. Moreover, the second converter 22 is configured such that the second adjusted current In2 having the ripple component Rn2 corresponding to a ripple component Rn1 in the second current In1 flowing from the negative-side node Nm to the negative terminal 11m is controlled so as to flow from the input-side terminal 22a to the negative-side node Nm.

For example, the first converter 21 is configured such that the ripple component Rp2 is controlled so as to take a waveform having an amplitude and phase substantially equal to those of the ripple component Rp1. Similarly, the second converter 22 is configured such that the ripple component Rn2 is controlled so as to take a waveform having an amplitude and phase substantially equal to those of the ripple component Rn1.

More specifically, as illustrated in FIG. 2, in Embodiment 1 the power converter 100 includes a current detector 51 which detects the first adjusted current Ip2 and a current detector 52 which detects the second adjusted current In2. The power converter 100 further includes an output voltage detector 53 which detects the output voltage value Vo of the power output to the load 102 from the output side of the first converter 21 and the output side of the second converter 22, as well as a controller 60 (see FIG. 1). Here, the controller 60 is an example of a "ripple component obtaining unit".

More specifically, the current detector 51 is arranged near a wire which connects together the positive-side node Np and the input-side terminal 21a. The current detector 52 is arranged near a wire which connects together the negative-side node Nm and the input-side terminal 22a. The current detectors 51 and 52 are respectively sensors which can detect the DC component and AC component (ripple component) of current. Moreover, the current detectors 51 and 52 are respectively connected to the controller 60 and configured to send signals representing detected values (detection results) to the controller 60. Furthermore, the output voltage detector 53 is configured to send the detected output voltage value Vo to the controller 60. Here, the current detector 51 is an example of a "first adjusted current detector". Similarly, the current detector 52 is an example of a "second adjusted current detector".

Figure 4:
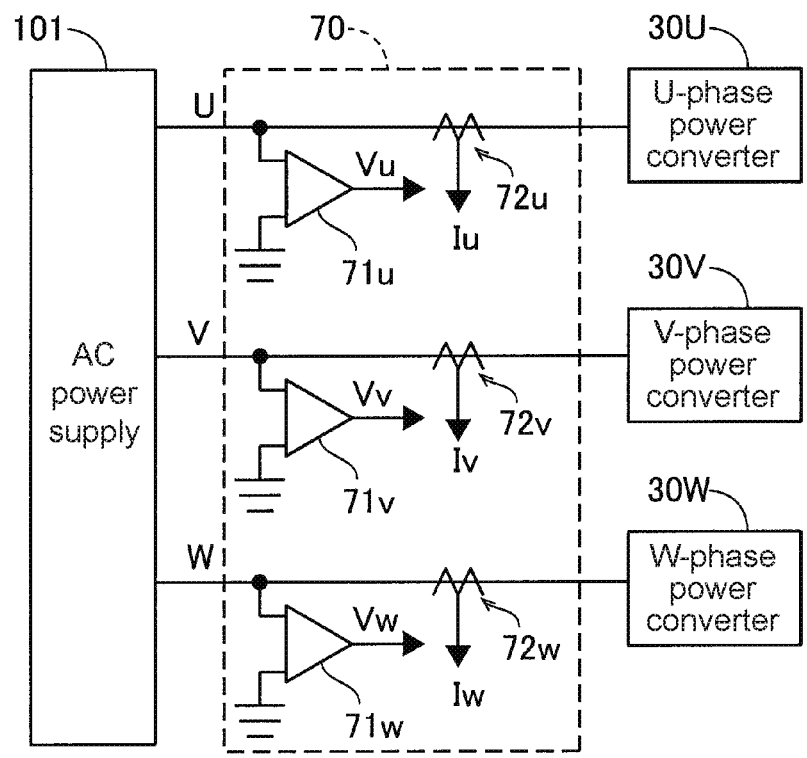
FIG. 4 is a block diagram illustrating an AC input detector according to Embodiment 1 of the present invention.

As illustrated in FIG. 4, the power converter 100 includes an AC input detector 70. This AC input detector 70 includes a voltage detector 71u which detects an input voltage value Vu of the AC input power input to the input-side converter 10, a voltage detector 71v which detects an input voltage value Vv, a voltage detector 71w which detects an input voltage value Vw, a current detector 72u which detects an input current value Iu of the AC input power, a current detector 72v which detects an input current value Iv, and a current detector 72w which detects an input current value Iw. The AC input detector 70 is configured to send the detected input voltage values Vu, Vv, and Vw as well as the detected input current values Iu, Iv, and Iw to the controller 60. Here, the AC input detector 70 is an example of a "ripple component obtaining unit".

Furthermore, as illustrated in FIG. 2, the power converter 100 includes a first voltage difference detector 81 and a second voltage difference detector 82. The first voltage difference detector 81 is configured to detect a first voltage difference Edp between the positive terminal 41p and negative terminal 41n of the positive-side capacitor 41. The second voltage difference detector 82 is configured to detect a second voltage difference Edn between the positive terminal 42p and negative terminal 42n of the negative-side capacitor 42. The first voltage difference detector 81 and the second voltage difference detector 82 are respectively configured to send the detected first voltage difference Edp and the detected second voltage difference Edn to the controller 60.

Furthermore, as illustrated in FIG. 1, the controller 60 includes an input-side controller 61 which controls the operation of the input-side converter 10 and an output-side controller 62 which controls the operation of the first converter 21 and the second converter 22. The controller 60 further includes a control circuit such as a central processing unit (CPU) as well as a gate driver circuit and the like, for example.

The input-side controller 61 is configured to individually control the operation of the U-phase power converter 30U, the V-phase power converter 30V, and the W-phase power converter 30W (operation of the switching devices 35a and 36a) on the basis of the input voltage values Vu, Vv, and Vw and input current values Iu, Iv, and Iw obtained from the AC input detector 70 as well as the first voltage difference Edp and second voltage difference Edn obtained from the first voltage difference detector 81 and the second voltage difference detector 82. More specifically, the input-side controller 61 is configured to perform feedback control (such as proportional-integral control) so as to make the first voltage difference Edp and the second voltage difference Edn become equal to a desired voltage value E/2.

In Embodiment 1, the output-side controller 62 is configured to obtain the ripple component Rp1 in the first current Ip1 (or the ripple component Rn1 in the second current In1) as well as to individually control the operation of the first converter 21 and the second converter 22 on the basis of the first adjusted current Ip2, the second adjusted current In2, and the ripple component Rp1 (or the ripple component Rn1).

Figure 5:
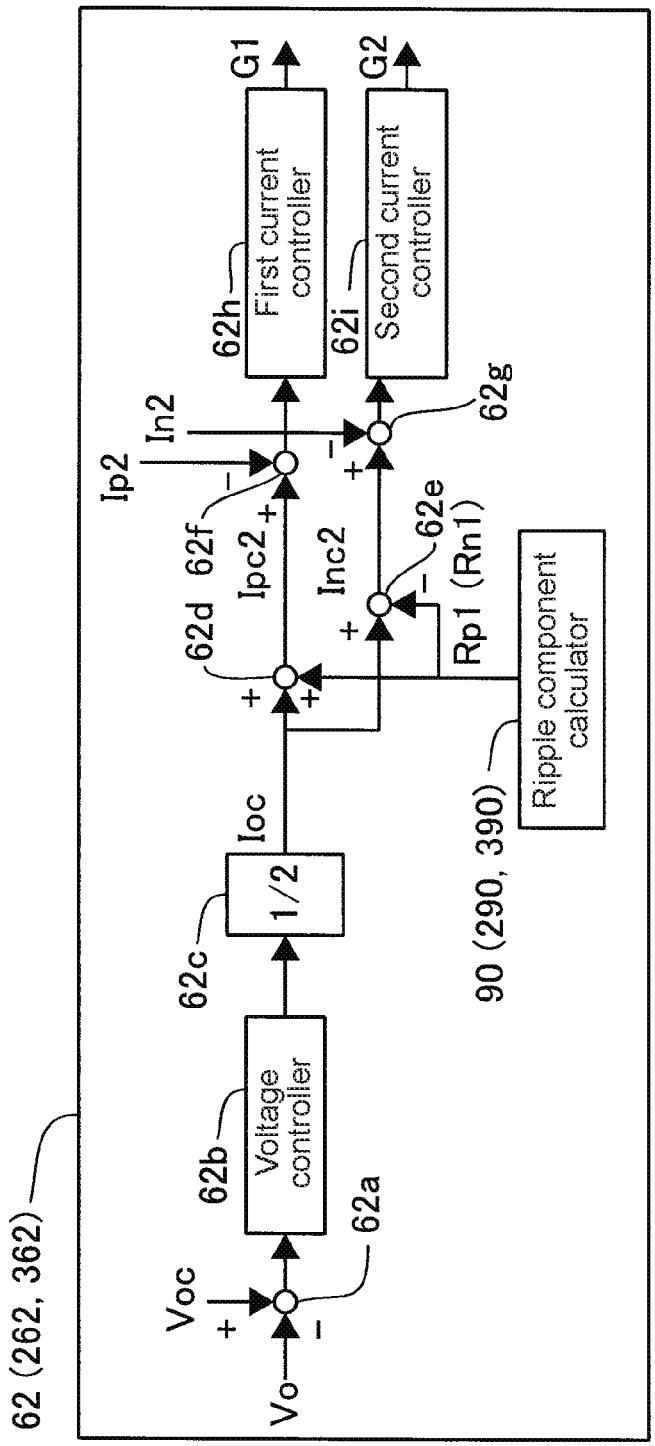
FIG. 5 is a block diagram illustrating an output-side controller according to Embodiments 1 to 3 of the present invention.

More specifically, as illustrated in FIG. 5, the output-side controller 62 adds the obtained ripple component Rp1 to a base current command value Ioc (or subtracts the obtained ripple component Rn1) to generate a first current command value Ipc2 for the first converter 21. Moreover, the output-side controller 62 is configured to generate a control signal G1 for the first converter 21 for causing the first adjusted current Ip2 to match this first current command value Ipc2. Furthermore, the output-side controller 62 subtracts the obtained ripple component Rp1 from the base current command value Ioc (or adds the obtained ripple component Rn1) to generate a second current command value Inc2 for the second converter 22. Moreover, the output-side controller 62 is configured to generate a control signal G2 for the second converter 22 for causing the second adjusted current In2 to match this second current command value Inc2. Here, the control signal G1 is an example of a "first control signal". Similarly, the control signal G2 is an example of a "second control signal".

More specifically, the output-side controller 62 includes a ripple component calculator 90 which calculates and obtains the ripple component Rp1 (or Rn1). The output-side controller 62 further includes calculators 62a, 62c, 62d, 62e, 62f, and 62g; a voltage controller 62b; a first current controller 62h; and a second current controller 62i. The ripple component calculator 90 is configured to obtain the ripple component Rp1 in the first current Ip1 and the ripple component Rn1 in the second current In1 on the basis of the input voltage values Vu, Vv, and Vw and input current values Iu, Iv, and Iw detected by the AC input detector 70. Here, calculating (obtaining) the ripple component Rp1 is an example of "obtaining a ripple component in a first current and a ripple component in a second current". Moreover, the calculated ripple component Rp1 is equal to the ripple component Rn1 if the polarity is reversed.

The calculator 62a is configured to obtain the difference between an output voltage command value Voc and the output voltage value Vo. The voltage controller 62b is configured to generate a current command value on the basis of this difference between the output voltage command value Voc and the output voltage value Vo. The calculator 62c is configured to calculate a value equal to one half of this current command value to generate the base current command value Ioc. The calculator 62d is configured to add together the base current command value Ioc and the ripple component Rp1 to generate the first current command value Ipc2. The calculator 62e is configured to subtract the ripple component Rp1 from the base current command value Ioc to generate the second current command value Inc2.

Furthermore, the calculator 62f is configured to subtract the detected first adjusted current Ip2 from the first current command value Ipc2. The calculator 62g is configured to subtract the detected second adjusted current In2 from the second current command value Inc2. In addition, the first current controller 62h is configured to generate the control signal G1 for the first converter 21 for making the difference between the first current command value Ipc2 and the detected first adjusted current Ip2 become equal to zero. Similarly, the second current controller 62i is configured to generate the control signal G2 for the second converter 22 for making the difference between the second current command value Inc2 and the detected second adjusted current In2 become equal to zero.

Here, the control signals G1 and G2 are respectively control signals which determine control quantities for controlling the first converter 21 and the second converter 22. The term "control quantities" refers to control quantities that can be adjusted in DC/DC converter technologies, such as pulse width and frequency, for example. In this way, the output-side controller 62 is configured to perform feedback control on the first converter 21 and the second converter 22 such that the first adjusted current Ip2 contains the ripple component Rp2 and the second adjusted current In2 contains the ripple component Rn2.

Figure 6:
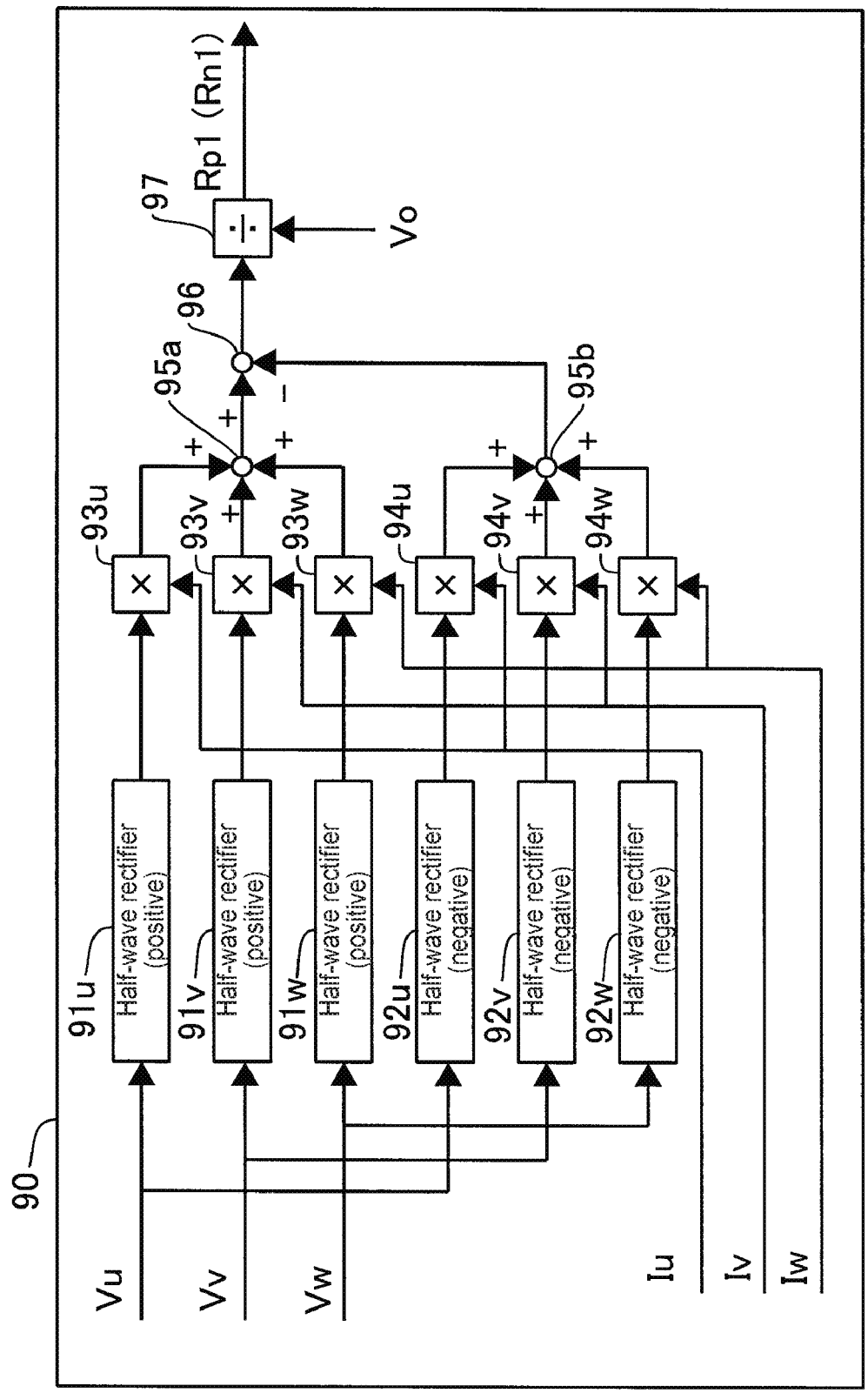
FIG. 6 is a block diagram illustrating a ripple component calculator according to Embodiment 1 of the present invention.

As illustrated in FIG. 6, the ripple component calculator 90 includes half-wave rectifiers 91*u*, 91*v*, and 91*w* which respectively half-wave rectify the positive voltage of the input voltage values Vu, Vv, and Vw as well as half-wave rectifiers 92*u*, 92*v*, and 92*w* which respectively half-wave rectify the negative voltage of the input voltage values Vu, Vv, and Vw.

Furthermore, the ripple component calculator 90 includes calculators 93*u*, 93*v*, and 93*w*; calculators 94*u*, 94*v*, and 94*w*; calculators 95*a* and 95*b*; a calculator 96; and a calculator 97. The calculator 93*u* is configured to calculate the product of the input current value Iu and the input voltage value Vu that has been half-wave rectified by the half-wave rectifier 91*u*. The calculator 93*v* is configured to calculate the product of the input current value Iv and the input voltage value Vv that has been half-wave rectified by the half-wave rectifier 91*v*. The calculator 93*w* is configured to calculate the product of the input current value Iw and the input voltage value Vw that has been half-wave rectified by the half-wave rectifier 91*w*.

The calculator 94*u* is configured to calculate the product of the input current value Iu and the input voltage value Vu that has been half-wave rectified by the half-wave rectifier 92*u*. The calculator 94*v* is configured to calculate the product of the input current value Iv and the input voltage value Vv that has been half-wave rectified by the half-wave rectifier 92*v*. The calculator 94*w* is configured to calculate the product of the input current value Iw and the input voltage value Vw that has been half-wave rectified by the half-wave rectifier 92*w*.

The calculator 95*a* is configured to calculate the sum of the products calculated by the calculators 93*u*, 93*v*, and 93*w*. The calculator 95*b* is configured to calculate the sum of the products calculated by the calculators 94*u*, 94*v*, and 94*w*. The calculator 96 is configured to calculate the difference between the sum calculated by the calculator 95*a* and the sum calculated by the calculator 95*b*. Moreover, the calculator 97 is configured to divide the difference calculated by the calculator 96 by the output voltage value Vo and then output (obtain) the resulting value as the ripple component Rp1 (or Rn1).

In this way, the first converter 21 is controlled such that the first adjusted current Ip2 containing the ripple component Rp2 flows on the input side, and the second converter 22 is controlled such that the second adjusted current In2 containing the ripple component Rn2 flows on the input side. Furthermore, the first converter 21 and the second converter 22 are controlled such that the output current Io (see FIG. 2) in which the ripple component Rp2 and the ripple component Rn2 have been canceled out flows on the output side.

(Operation of Power Converter According to Embodiment 1)

Next, the operation of the power converter 100 according to Embodiment 1 will be described by way of comparison with the operation of a power converter according to a comparison example.

The power converter according to the comparison example includes a single DC/DC converter with the input side thereof connected to a positive-side node Np and a negative-side node Nm of an input-side converter. Note that the configuration of the power converter according to the comparison example is only an example for describing the operation of the power converter 100 according to Embodiment 1 and is not intended to imply that the entire configuration of the power converter according to the comparison example is conventional technology.

Figure 7:
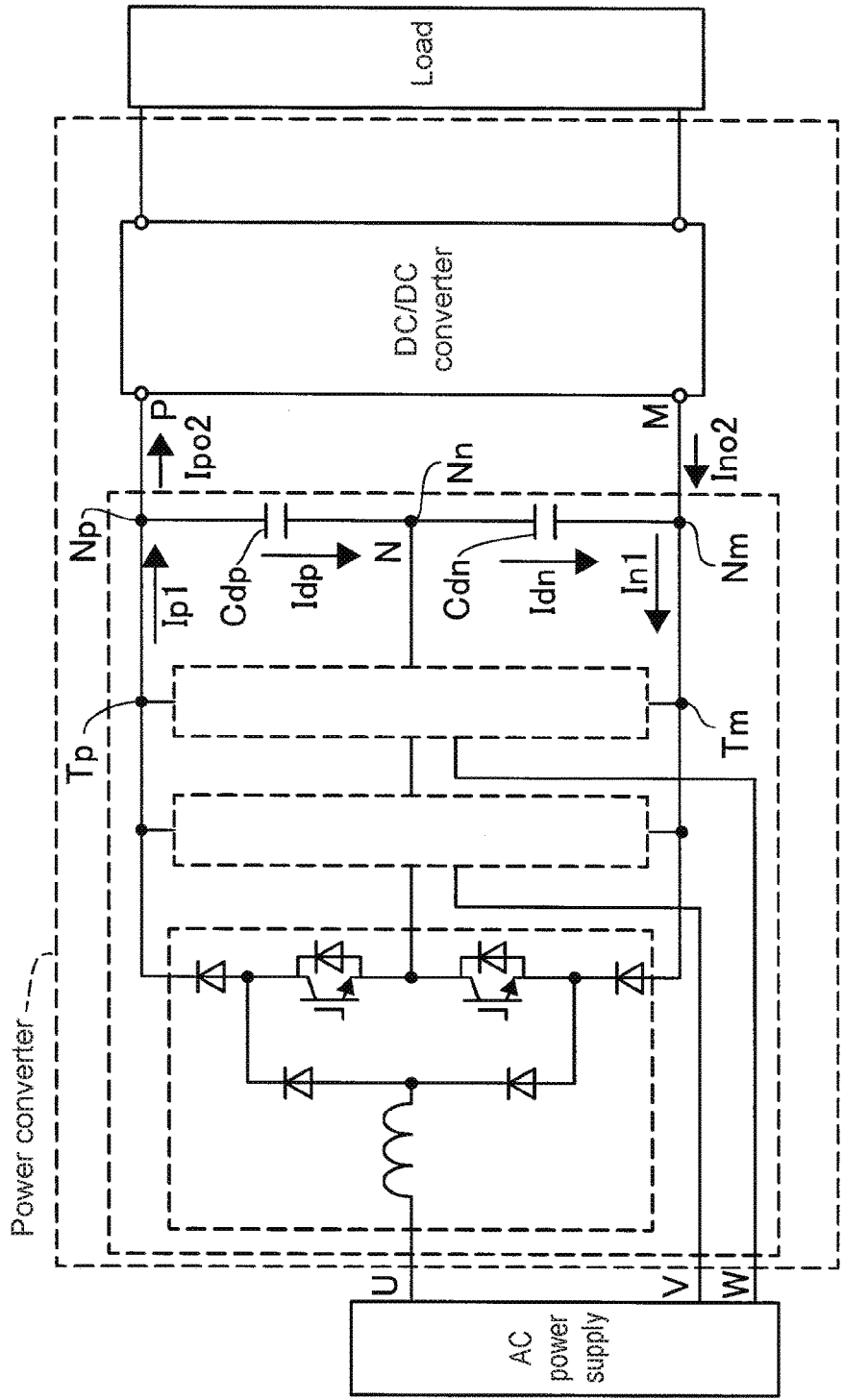
FIG. 7 is a block diagram illustrating a power converter according to a comparison example.
Figure 8:
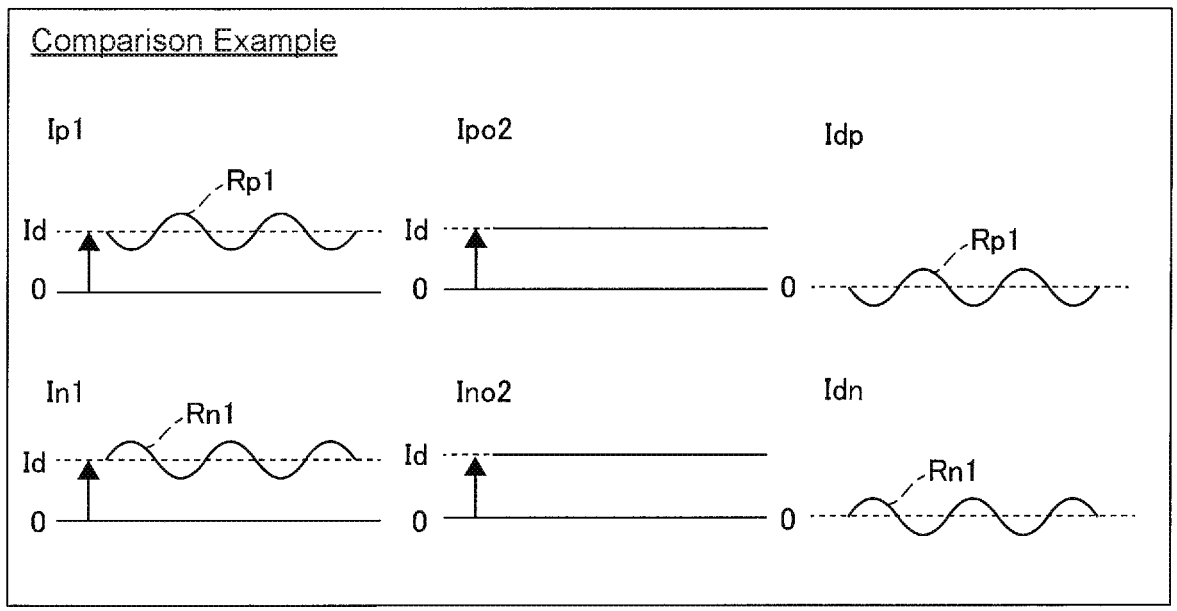
FIG. 8 illustrates the waveforms of a first current and a second current in the power converter according to the comparison example.

As illustrated in FIGS. 7 and 8, in the power converter according to the comparison example, a first current Ip1 having a ripple component Rp1 flows from a positive terminal Tp to the positive-side node Np, and a second current In1 having a ripple component Rn1 flows from the negative-side node Nm to a negative terminal Tm. Here, let a current which flows from the positive-side node Np to the negative-side node Nm (the common current components of the first current Ip1 and the second current In1) be Id. If the input-side converter outputs a three-phase balanced current, this current Id takes a DC value (constant value). Moreover, letting A be a constant and $\theta$ be the phase of the input voltage ($=2\pi \times$frequency f of input voltage$\times$time t from some base time), the first current Ip1 and the second current In1 can respectively be expressed in the form of equations (1) and (2) below. Here, for the first current Ip1, the direction of flowing from the positive terminal to the negative terminal of a positive-side capacitor Cdp is positive, while for the second current In1, the direction of flowing from the positive terminal to the negative terminal of a negative-side capacitor Cdn is positive. Note that for simplicity, the following description ignores currents of switching frequency components associated with switching operations.

$$Ip1 = Id + A\cos 3\theta \quad (1)$$

$$In1 = Id - A\cos 3\theta \quad (2)$$

Thus, letting B be a constant, a current Ipo2 flowing from the positive-side node Np to an input-side terminal of the DC/DC converter and a current Ino2 flowing from an input-side terminal of the DC/DC converter to the negative-side node Nm can be expressed in the form of equations (3) and (4) below.

$$Ipo2 = B \text{ (constant value; under steady-state conditions } B = Id) \quad (3)$$

$$Ino2 = B \text{ (constant value; under steady-state conditions } B = Id) \quad (4)$$

Here, letting the current (charge/discharge current) flowing through the positive-side capacitor Cdp be Idp and the current (charge/discharge current) flowing through the negative-side capacitor Cdn be Idn, under steady-state conditions (B=Id) Idp and Idn can be expressed in the form of equations (5) and (6) below.

$$Idp = Ip1 - Ipo2 = A\cos 3\theta \quad (5)$$

$$Idn = In1 - Ino2 = -A\cos 3\theta \quad (6)$$

Moreover, when three-phase balanced current is input from the AC power supply, the maximum values of Idp and Idn are equal to ¾ the magnitude of Id, and the minimum values of Idp and Idn are equal to ⅔ the magnitude of Id. In other words, the constant A is equal to ⅓ the magnitude of Id. Thus, in the power converter according to the comparison example, the current Idp having the ripple component Rp1 (A$\cos 3\theta$) flows through the positive-side capacitor Cdp, and the current Idn having the ripple component Rn1 (−A$\cos 3\theta$) flows through the negative-side capacitor Cdn. As a result, in the power converter according to the comparison example, the positive-side capacitor Cdp and the negative-side capacitor Cdn must be designed to have a capacitance that accounts for the ripple component Rp1 (Rn1) (a relatively large capacitance).

Next, in the power converter 100 according to Embodiment 1, three-phase (U, V, and W-phase) AC power (input power) is input from the AC power supply 101 to the input-side converter 10 of the power converter 100. Furthermore, the U-phase power converter 30U, V-phase power converter 30V, and W-phase power converter 30W of the input-side converter 10 rectify this AC power into DC power. Thus, as illustrated in FIG. 2, the first current Ip1 having the ripple component Rp1 flows from the positive terminal 11p to the positive-side node Np, and the second current In1 having the ripple component Rn1 flows from the negative-side node Nm to the negative terminal 11m.

Here, under steady-state conditions, letting the current that flows from the positive-side node Np to the negative-side node Nm be Id, the first current Ip1 takes a waveform in which the ripple component Rp1 is superimposed onto this constant value Id. Moreover, the second current In1 takes a waveform in which the ripple component Rn1 (a waveform in which the polarity of the ripple component Rp1 is inverted) is superimposed onto the constant value Id. In other words, these currents can be expressed in the form of equations (7) and (8) below. Here, for the first current Ip1, the direction of flowing from the positive terminal 41p to the negative terminal 41n of the positive-side capacitor 41 is positive, while for the second current In1, the direction of flowing from the positive terminal 42p to the negative terminal 42n of the negative-side capacitor 42 is positive.

$$Ip1 = Id + A\cos 3\theta \quad (7)$$

$$In1 = Id - A\cos 3\theta \quad (8)$$

Furthermore, in Embodiment 1, on the input side of the first converter 21, the first adjusted current Ip2 having the ripple component Rp2 ($A\cos 3\theta$) corresponding to the ripple component Rp1 ($A\cos 3\theta$) in the first current Ip1 flowing from the positive terminal 11p to the positive-side node Np flows from the positive-side node Np to the input-side terminal 21a. Moreover, on the input side of the second converter 22, the second adjusted current In2 having the ripple component Rn2 ($-A\cos 3\theta$) corresponding to the ripple component Rn1 ($-A\cos 3\theta$) in the second current In1 flowing from the negative-side node Nm to the negative terminal 11m flows from the input-side terminal 22a to the negative-side node Nm. In other words, the first adjusted current Ip2 and the second adjusted current In2 can be expressed in the form of equations (9) and (10) below.

$$Ip2 = B + A\cos 3\theta \text{ (under steady-state conditions } B = Id) \quad (9)$$

$$In2 = B - A\cos 3\theta \text{ (under steady-state conditions } B = Id) \quad (10)$$

Here, letting the current (charge/discharge current) flowing through the positive-side capacitor 41 be Idp and the current (charge/discharge current) flowing through the negative-side capacitor 42 be Idn, under steady-state conditions (B=Id) Idp and Idn can be expressed in the form of equations (11) and (12) below.

$$Idp = Ip1 - Ip2 = 0 \quad (11)$$

$$Idn = In1 - In2 = 0 \quad (12)$$

In other words, unlike in the power converter according to the comparison example, in the power converter 100 according to Embodiment 1, ripple current (the ripple components Rp1 and Rn1) and particularly the low-frequency components thereof are reduced (become substantially equal to zero) in the positive-side capacitor 41 and the negative-side capacitor 42. Moreover, although currents of switching frequency components associated with switching operations that were ignored in the description above also flow through the positive-side capacitor 41 and the negative-side capacitor 42, in Embodiment 1 at least one of the ripple components Rp1 and Rn1 is reduced (unlike in the comparison example).

Effects of Embodiment 1

Embodiment 1 makes it possible to achieve the following effects.

In Embodiment 1, as described above, the power converter 100 includes the first converter 21 and the second converter 22, the input sides thereof being connected together in series and the output sides thereof being connected together in parallel. Thus, on the input sides of the first converter 21 and the second converter 22, currents having mutually different current waveforms (the first adjusted current Ip2 and the second adjusted current In2) can be passed, and on the output side, the output current Io in which waveforms are combined can be passed (output). Therefore, by controlling the operation of the first converter 21 such that the ripple component Rp2 is contained in the current waveform flowing into the input side of the first converter 21, the ripple component Rp1 in the first current Ip1 flowing from the positive terminal 11p to the first converter 21 and the positive-side capacitor 41 can be made to flow into the first converter 21 instead of the positive-side capacitor 41. In other words, the current Ipd in which the ripple component Rp2 on the first converter 21 side and the ripple component Rp1 on the input-side converter 10 side have been canceled out flows into the positive-side capacitor 41, thereby making it possible to reduce the ripple component in the current Ipd that flows into the positive-side capacitor 41. Meanwhile, by controlling the operation of the second converter 22 such that the ripple component is contained in the current waveform that flows into the input side of the second converter 22, the ripple component in the current Idn that flows into the negative-side capacitor 42 can be reduced similarly to in the positive-side capacitor 41. To the extent that these ripple components are reduced, the need to increase the capacitance of the positive-side capacitor 41 and the negative-side capacitor 42 is eliminated, thereby making it possible to mitigate lifespan shortening. This makes it possible to use capacitors other than electrolytic capacitors with relatively short lifespans for the positive-side capacitor 41 and the negative-side capacitor 42, for example, thereby making it possible to mitigate lifespan shortening. Moreover, because the capacitance of the positive-side capacitor 41 and the negative-side capacitor 42 does not need to be increased, increases in the size of the positive-side capacitor 41 and the negative-side capacitor 42 can be avoided. Furthermore, the phase of the ripple component Rp2 in the current waveform on the input side of the first converter 21 and the phase of the ripple component Rn2 in the current waveform on the input side of the second converter 22 are different by 180° (the polarity is inverted), and therefore these ripple components get canceled out on the output side of the first converter 21 and the second converter 22. Thus, on the output side of the first converter 21 and the second converter 22, it is possible to output DC output power in a state in which ripple components have been reduced as a result of the waveforms being combined. As a result of these effects, shortening of the lifespans of the positive-side capacitor 41 and the negative-side capacitor 42 can be mitigated. It should also be noted that although supplying three-phase balanced input current to a power converter having a so-called two-level circuit configuration does not result in creation of any low-frequency ripple, using a three-level circuit configuration as in the power converter 100 according to Embodiment 1 makes it possible to miniaturize the reactor, reduce switching loss, and use switching devices with lower breakdown voltages than in a two-level circuit.

Moreover, as described above, in Embodiment 1 the power converter 100 is configured such that the first adjusted current Ip2 having the ripple component Rp2 flows from the positive terminal 11$p$ to the input side of the first converter 21 and such that the second adjusted current In2 having the ripple component Rn2 flows from the input side of the second converter 22 to the negative terminal 11$m$. Furthermore, the power converter 100 is configured such that the output current Io in which at least one of the ripple components has been canceled out flows from the output side of the first converter 21 and the output side of the second converter 22 to the load 102. As a result, in the positive-side capacitor 41, the ripple component Rp1 in the first current Ip1 that flows from the positive terminal 11$p$ towards the positive-side capacitor 41 and the input side of the first converter 21 flows towards the first converter 21 side instead of the positive-side capacitor 41 side, thereby making it possible to effectively reduce the ripple component in the current Idp that flows through the positive-side capacitor 41. Furthermore, in the negative-side capacitor 42, the ripple component can also be effectively reduced similarly to in the positive-side capacitor 41.

In addition, as described above, in Embodiment 1 the input-side terminal 21$a$ of the first converter 21 is connected to the positive-side node Np that connects the positive terminal 11$p$ and the positive-side capacitor 41, and the input-side terminal 21$b$ is connected to the neutral terminal 11$n$. Moreover, the input-side terminal 22$a$ on the input side of the second converter 22 is connected to the negative-side node Nm that connects the negative terminal 11$m$ and the negative-side capacitor 42, and the input-side terminal 22$b$ on the input side is connected to the neutral terminal 11$n$. Furthermore, due to the output-side terminal 21$c$ of the first converter 21 and the output-side terminal 22$c$ of the second converter 22 being connected together as well as the output-side terminal 21$d$ of the first converter 21 and the output-side terminal 22$d$ on the output side of the second converter 22 being connected together, the input side of the first converter 21 and the input side of the second converter 22 are connected in series, and the output side of the first converter 21 and the output side of the second converter 22 are connected in parallel. As a result, in the positive-side capacitor 41, the ripple component in the current Ip1 that flows from the positive terminal 11$p$ towards the positive-side node Np flows from the positive-side node Np towards the first converter 21 side instead of from the positive-side node Np towards the positive-side capacitor 41 side, thereby making it possible to more effectively reduce the ripple component in the current Idp that flows through the positive-side capacitor 41. Furthermore, in the negative-side capacitor 42, the ripple component can also be more effectively reduced similarly to in the positive-side capacitor 41.

Moreover, as described above, in Embodiment 1 the first converter 21 is configured such that the first adjusted current Ip2 having the ripple component Rp2 corresponding to the ripple component Rp1 in the first current Ip1 flowing from the positive terminal 11$p$ to the positive-side node Np is controlled so as to flow from the positive-side node Np to the input-side terminal 21$a$, and the second converter 22 is configured such that the second adjusted current In2 having the ripple component Rn2 corresponding to the ripple component Rn1 in the second current In1 flowing from the negative-side node Nm to the negative terminal 11$m$ is controlled so as to flow from the input-side terminal 22$a$ to the negative-side node Nm. As a result, the first adjusted current Ip2 and the second adjusted current In2 can be generated in accordance with the ripple component Rp1 in the first current Ip1 and the ripple component Rn1 in the second current In1 so as to reduce the ripple components in the currents Idp and Idn that flow into the positive-side capacitor 41 and the negative-side capacitor 42, and therefore even when the waveforms of the ripple component Rp1 in the first current Ip1 and the ripple component Rn1 in the second current In1 change, the ripple component in the current Idp that flows from the positive-side node Np to the positive-side capacitor 41 and the ripple component in the current Idn that flows from the negative-side capacitor 42 to the negative-side node Nm can still be reduced.

Furthermore, as described above, in Embodiment 1 the power converter 100 includes the output voltage detector 53 that detects the output voltage value Vo of the first converter 21 and the second converter 22, the current detector 51 that detects the first adjusted current Ip2, the current detector 52 that detects the second adjusted current In2, the ripple component calculator 90 that obtains the ripple component Rp1 in the first current Ip1 and the ripple component Rn1 in the second current In1, and the controller 60 that individually controls the operation of the first converter 21 and the second converter 22 on the basis of the output voltage value Vo, the first adjusted current Ip2, the second adjusted current In2, the ripple component Rp1 in the first current Ip1, and the ripple component Rn1 in the second current In1. This makes it possible to, on the basis of the detected first adjusted current Ip2 and second adjusted current In2 as well as the obtained ripple component Rp1 in the first current Ip1 and ripple component Rn1 in the second current In1, generate a first adjusted current Ip2 and a second adjusted current In2 that are capable of appropriately reducing the ripple component in the current Idp flowing through the positive-side capacitor 41 and the ripple component in the current Idn flowing through the negative-side capacitor 42.

In addition, as described above, in Embodiment 1 the controller 60 is configured to add the obtained ripple component Rp1 to the base current command value Ioc to generate the first current command value Ipc2 for the first converter 21 and to also generate the control signal G1 for the first converter 21 for causing the first adjusted current Ip2 to match this first current command value Ipc2, as well as to subtract the obtained ripple component Rp1 from the base current command value Ioc to generate the second current command value Inc2 for the second converter 22 and to also generate the control signal G2 for the second converter 22 for causing the second adjusted current In2 to match this second current command value Inc2. Thus, using the control signals G1 and G2, the first adjusted current Ip2 and the second adjusted current In2 can be periodically updated so as to take appropriate waveforms, and therefore even if the magnitudes of the ripple components Rp1 and Rn1 fluctuate, the ripple component in the current Idp flowing through the positive-side capacitor 41 and the ripple component in the current Idn flowing through the negative-side capacitor 42 can still be appropriately reduced.

Furthermore, as described above, in Embodiment 1 the power converter 100 includes the AC input detector 70 that detects the input voltage values Vu, Vv, and Vw and input current values Iu, Iv, and Iw of the AC input power that is input to the input-side converter 10. The ripple component calculator 90 is configured to obtain the ripple component Rp1 in the first current Ip1 and the ripple component Rn1 in the second current In1 on the basis of the input voltage values Vu, Vv, and Vw and input current values Iu, Iv, and Iw detected by the AC input detector 70. This makes it possible to estimate (obtain) the ripple component Rp1 in the first current Ip1 and the ripple component Rn1 in the second current In1 without having to include detectors for detecting the first current Ip1 and the second current In1 directly. Therefore, the ripple component Rp1 in the first current Ip1 and the ripple component Rn1 in the second current In1 can be obtained while avoiding an increase in the size of the power converter 100.

Embodiment 2

Next, the configuration of a power converter 200 according to Embodiment 2 of the present invention will be described with reference to FIGS. 1, 2, 5, and 9. In Embodiment 2, a ripple component calculator 290 is configured to obtain a ripple component Rp1 of a first current Ip1 and a ripple component Rn1 of a second current In1 on the basis of a first voltage difference Edp and a second voltage difference Edn. Note that components of the configuration that are the same as in Embodiment 1 above are illustrated with the same reference characters in the figures and will not be described again here.

As illustrated in FIG. 1, the power converter 200 according to Embodiment 2 includes a controller 260. The controller 260 includes an input-side controller 61 and an output-side controller 262. As illustrated in FIG. 5, the output-side controller 262 includes the ripple component calculator 290. Here, the controller 260, the output-side controller 262, and the ripple component calculator 290 are an example of a "ripple component obtaining unit".

In Embodiment 2, the ripple component calculator 290 is configured to obtain the ripple component Rp1 in the first current Ip1 and the ripple component Rn1 in the second current In1 on the basis of the first voltage difference Edp across the terminals of a positive-side capacitor 41 as detected by a first voltage difference detector (voltage detector) 81 (see FIG. 2) and the second voltage difference Edn across the terminals of a negative-side capacitor 42 as detected by a second voltage difference detector (voltage detector) 82 (see FIG. 2).

Figure 9:
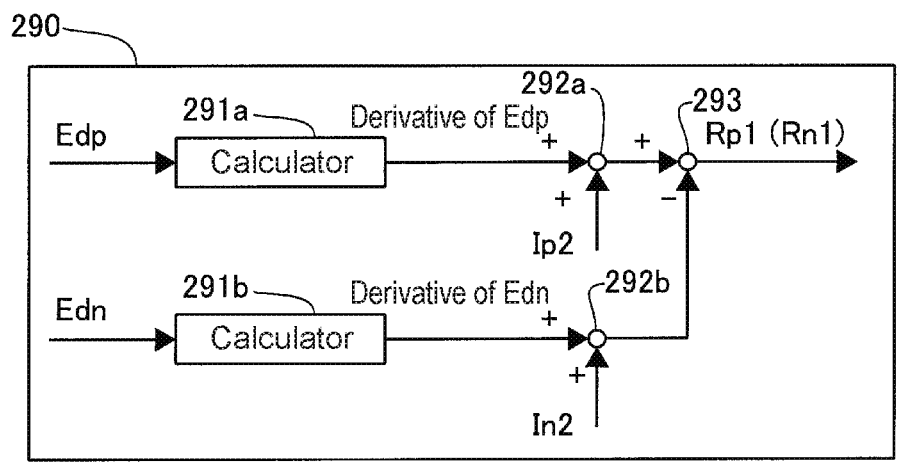
FIG. 9 is a block diagram illustrating a ripple component calculator according to Embodiment 2 of the present invention.

More specifically, as illustrated in FIG. 9, the ripple component calculator 290 includes a calculator 291a which calculates the derivative of the first voltage difference Edp and a calculator 291b which calculates the derivative of the second voltage difference Edn. In other words, the ripple component calculator 290 is configured to calculate the derivative of the first voltage difference Edp and the derivative of the second voltage difference Edn in order to obtain an estimated value of a current Idp flowing through the positive-side capacitor 41 and an estimated value of a current Idn flowing through the negative-side capacitor 42.

The ripple component calculator 290 further includes a calculator 292a which adds a detected first adjusted current Ip2 to the derivative of the first voltage difference Edp, a calculator 292b which adds a detected second adjusted current In2 to the derivative of the second voltage difference Edn, and a calculator 293 which calculates the difference between the sum from the calculator 292a and the sum from the calculator 292b. Moreover, the ripple component calculator 290 is configured to calculate (obtain) an output value of the calculator 293 (a value equal to ½ of the output value) as the ripple component Rp1 (or Rn1).

In this way, similar to in Embodiment 1, in Embodiment 2 a first converter 21 is controlled such that the first adjusted current Ip2 containing a ripple component Rp2 flows on the input side, and a second converter 22 is controlled such that the second adjusted current In2 containing a ripple component Rn2 flows on the input side. Furthermore, the first converter 21 and the second converter 22 are controlled such that an output current Io in which the ripple component Rp2 and the ripple component Rn2 have been canceled out flows on the output side. The rest of the configuration of Embodiment 2 is the same as the configuration of Embodiment 1.

Effects of Embodiment 2

As described above, in Embodiment 2 the power converter 200 includes the first voltage difference detector 81 that detects the first voltage difference Edp across the terminals of the positive-side capacitor 41 and the second voltage difference detector 82 that detects the second voltage difference Edn across the terminals of the negative-side capacitor 42. Moreover, the ripple component calculator 290 is configured to obtain the ripple component Rp1 in the first current Ip1 and the ripple component Rn1 in the second current In1 on the basis of the first voltage difference Edp and the second voltage difference Edn detected by the first voltage difference detector 81 and the second voltage difference detector 82. This, in comparison to detecting the ripple components Rp1 and Rn1 using current detectors that detect the first current Ip1 and the second current In1 directly, makes it possible to avoid an increase in size or complexity of the ripple component calculator 290. The rest of the effects of Embodiment 2 are the same as the effects of Embodiment 1.

Embodiment 3

Next, the configuration of a power converter 300 according to Embodiment 3 of the present invention will be described with reference to FIGS. 5, 10, and 11. In Embodiment 3, the power converter 300 includes a first current detector 301 which detects a first current Ip1 and a second current detector 302 which detects a second current In1. Moreover, a ripple component calculator 390 is configured to obtain a ripple component Rp1 in the first current Ip1 and a ripple component Rn1 in the second current In1 on the basis of the first current Ip1 and the second current In1 detected by the first current detector 301 and the second current detector 302. Note that components of the configuration that are the same as in Embodiment 1 and Embodiment 2 above are illustrated with the same reference characters in the figures and will not be described again here.

Figure 10:
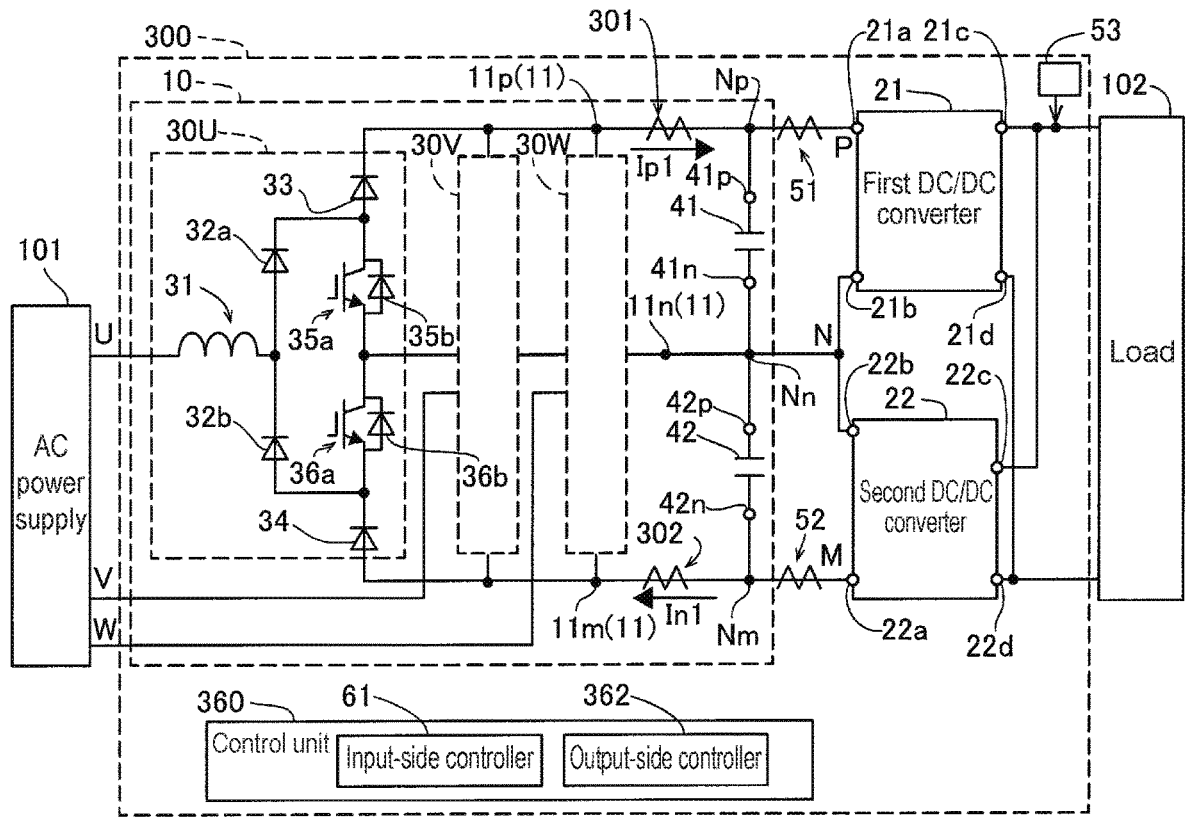
FIG. 10 is a block diagram illustrating the configuration of a power converter according to Embodiment 3 of the present invention.

As illustrated in FIG. 10, the power converter 300 according to Embodiment 3 includes the first current detector 301 that detects the first current Ip1, the second current detector 302 that detects the second current In1, and a controller 360. The first current detector 301 is arranged on a wire (or near a wire) that connects a positive terminal 11p and a positive-side node Np. The second current detector 302 is arranged on a wire (or near a wire) that connects a negative terminal 11m and a negative-side node Nm. The controller 360 includes an input-side controller 61 and an output-side controller 362. As illustrated in FIG. 5, the output-side controller 362 includes the ripple component calculator 390. Here, the first current detector 301, the second current detector 302, the controller 360, the output-side controller 362, and the ripple component calculator 390 are an example of a "ripple component obtaining unit".

Figure 11:
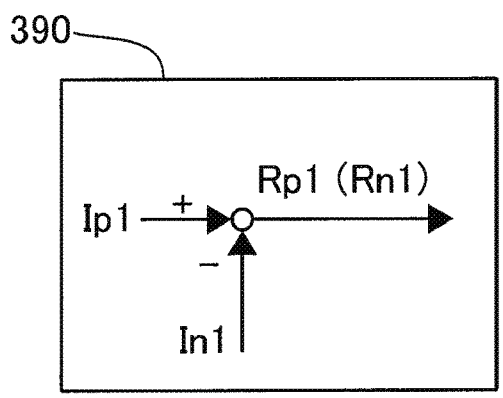
FIG. 11 is a block diagram illustrating a ripple component calculator according to Embodiment 3 of the present invention.

Here, as illustrated in FIG. 11, in Embodiment 3 the ripple component calculator 390 is configured to calculate (obtain) the difference between the first current Ip1 as detected by the first current detector 301 and the second current In1 as detected by the second current detector 302 (more specifically, a value equal to ½ of this difference) as the ripple component Rp1 (or Rn1).

In this way, similar to in Embodiment 1, in Embodiment 3 a first converter 21 is controlled such that a first adjusted current Ip2 containing a ripple component Rp2 flows on the input side, and a second converter 22 is controlled such that a second adjusted current In2 containing a ripple component Rn2 flows on the input side. Furthermore, the first converter 21 and the second converter 22 are controlled such that an output current Io in which the ripple component Rp2 and the ripple component Rn2 have been canceled out flows on the output side. The rest of the configuration of Embodiment 3 is the same as the configuration of Embodiment 1.

Effects of Embodiment 3

As described above, in Embodiment 3 the power converter 300 includes the first current detector 301 that detects the first current Ip1 and the second current detector 302 that detects the second current In1. The ripple component calculator 390 is configured to obtain the ripple component Rp1 in the first current Ip1 and the ripple component Rn1 in the second current In1 on the basis of the first current Ip1 and the second current In1 detected by the first current detector 301 and the second current detector 302. Thus, the ripple component Rp1 in the first current Ip1 and the ripple component Rn1 in the second current In1 can be detected (obtained) directly by the first current detector 301 and the second current detector 302, thereby making it possible to obtain the ripple component Rp1 or Rn1 more accurately than when estimating (calculating) the ripple component Rp1 or Rn1 from other physical quantities. The rest of the effects of Embodiment 3 are the same as the effects of Embodiment 1.

Modification Examples

It should be noted that in all respects, the embodiments described above are only examples and do not limit the present invention in any way. The scope of the present invention is defined by the claims, not by the descriptions of the embodiments above. Furthermore, the scope of the present invention also includes all changes (modification examples) made within the scope of the claims and their equivalents.

For example, in the embodiments described above, an example input-side converter in which the U-phase power converter, the V-phase power converter, and the W-phase power converter include diodes arranged between the switching devices and the positive terminal as well as between the switching devices and the negative terminal (that is, an example in which the input-side converter is configured as an AC/DC converter) was described. However, the present invention is not limited to this example. For example, the input-side converter may be configured as a so-called neutral-point-clamped three-level converter by arranging switching devices instead of diodes between the switching devices and the positive terminal as well as between the switching devices and the negative terminal in the U-phase power converter, the V-phase power converter, and the W-phase power converter.

Moreover, although in the embodiments described above the positive-side capacitor and negative-side capacitor are depicted as respectively being single capacitors in FIG. 1, the present invention is not limited to this example. For example, the positive-side capacitor and the negative-side capacitor may respectively be constituted by a plurality of capacitors (arranged in a series circuit or parallel circuit).

Furthermore, although in the embodiments above the controller, the first converter and the second converter were described as being configured such that ripple components that are substantially identical to the ripple components in the first current and the second current are superimposed onto the first adjusted current and the second adjusted current as an example, the present invention is not limited to this example. For example, the controller, the first converter, and the second converter may be configured such that ripple components of smaller amplitude than the ripple components in the first current and the second current are superimposed onto the first adjusted current and the second adjusted current (so that only one of the ripple components get canceled out).

In addition, although in the embodiments above the power converter was described as including a single controller that controls the input-side converter and the first converter and second converter as an example, the present invention is not limited to this example. For example, the input-side converter may include a controller that controls the input-side converter, the first converter may include a controller that controls the first converter and is separate from the controller that controls the input-side converter, and the second converter may include a controller that controls the second converter and is separate from the controller that controls the input-side converter.

Moreover, although in the embodiments above the first converter and the second converter were described as being configured such that the first adjusted current and the second adjusted current are periodically updated by way of feedback control as an example, the present invention is not limited to this example. For example, the first converter and the second converter may be configured such that the first adjusted current and the second adjusted current are generated using a control scheme other than feedback control.

Furthermore, although in the embodiments above the ripple component calculator was described as being configured to obtain both the ripple component in the first current and the ripple component in the second current as an example, the present invention is not limited to this example. For example, the ripple component calculator may be configured to obtain at least one ripple component among the ripple component in the first current and the ripple component in the second current. In this case, the controller is configured to, on the basis of at least one ripple component among the ripple component in the first current and the ripple component in the second current, generate a first adjusted current and second adjusted current corresponding to that ripple component.

In addition, although in the embodiments above the positive-side capacitor and the negative-side capacitor were described as being constituted by capacitors other than electrolytic capacitors as an example, the present invention is not limited to this example. For example, the positive-side capacitor and the negative-side capacitor may be constituted by electrolytic capacitors as long as those electrolytic capacitors have a relatively long lifespan.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A power converter, comprising:
an input-side converter circuit including:
  a DC output terminal section having a positive terminal, a negative terminal, and a neutral terminal;
  a positive-side capacitor, one end of which is connected to the positive terminal through a positive node and another end of which is connected to the neutral terminal through a neutral node; and
  a negative-side capacitor, one end of which is connected to the neutral terminal through said neutral node and another end of which is connected to the negative terminal through a negative node;
a first output-side converter circuit having first and second input terminals, the first input terminal being connected to the positive node and the second input terminal being connected to the neutral node, the first output-side converter circuit further having two output terminals, respectively connected to two main output terminals of the power converter; and
a second output-side converter circuit having first and second input terminals, the first input terminal being connected to the neutral node and the second input terminal being connected to the negative node so that the first and second input terminals of the first output-side converter circuit and the first and second input terminals of the second output-side converter circuit are connected in series, the second output-side converter circuit further having two output terminals, respectively connected to the two main output terminals of the power converter so that the two output terminals of the first output-side converter circuit and the two output terminals of the second output-side converter circuit are connected in parallel to each other.

2. The power converter according to claim 1,
wherein the power converter is configured such that a current having a ripple component flows from the positive terminal to the first input terminal of the first output-side converter circuit and a current having a ripple component flows from the second input terminal of the second output-side converter circuit to the negative terminal, and
wherein the power converter is configured such that a current in which said ripple components are cancelled out with each other at least partially flows between the two main output terminals of the power converter through the load when the two main output terminals are connected to the load.

3. The power converter according to claim 1,
wherein the two output terminals of the first output-side converter circuit are positive and negative output terminals, respectively, and the two output terminals of the second output-side converter circuit are positive and negative output terminals, respectively, and
wherein the positive output terminal of the first output-side converter circuit and the positive output terminal of the second output-side converter circuit are connected to each other to constitute a positive output terminal of the power converter, and the negative output terminal of the first output-side converter circuit and the negative output terminal of the second output-side converter circuit are connected to each other to constitute a negative output terminal of the power converter.

4. The power converter according to claim 1,
wherein the first output-side converter circuit is controlled such that a first adjusted current flows from the positive node to the first input terminal of the first output-side converter circuit, said first adjusted current having a ripple component corresponding to a ripple component of a first current that flows from the positive terminal to the positive node, and
wherein the second output-side converter circuit is controlled such that a second adjusted current flows from the second input terminal of the second output-side converter circuit to the negative node, said second adjusted current having a ripple component corresponding to a ripple component of a second current that flows from the negative node to the negative terminal.

5. The power converter according to claim 4, further comprising:
an output voltage detector that detects an output voltage between the two main output terminals of the power converter;
a first adjusted current detector that detects the first adjusted current;
a second adjusted current detector that detects the second adjusted current;
a ripple component obtaining unit that obtains the ripple component of the first current and the ripple component of the second current; and
a controller that controls the first output-side converter circuit and the second output-side converter circuit on the basis of the detected output voltage, the detected first adjusted current, the detected second adjusted current, the obtained ripple component of the first current, and the obtained ripple component of the second current so that the ripple component of the first adjusted current corresponds to the ripple component of the first current that flows from the positive terminal to the positive node and so that the ripple component of the second adjusted current corresponds to the ripple component of the second current that flows from the negative node to the negative terminal.

6. The power converter according to claim 5, wherein the controller adds the obtained ripple component of the first current to a base current command value to generate a first current command value for the first output-side converter circuit and generates a first control signal for causing the first adjusted current to match the first current command value, and subtracts the obtained ripple component of the first current from the base current command value to generate a second current command value for the second output-side converter circuit and generates a second control signal for causing the second adjusted current to match the second current command value.

7. The power converter according to claim 5, wherein the ripple component obtaining unit includes an AC input detector that detects an input voltage and an input current of an AC input power that is inputted to the input-side converter circuit, and calculates the ripple component of the first current and the ripple component of the second current on the basis of the input voltage and the input current detected by the AC input detector.

8. The power converter according to claim 5, wherein the ripple component obtaining unit includes a first voltage detector that detects a first voltage across the positive-side capacitor and a second voltage detector that detects a second voltage across the negative-side capacitor, and calculates the ripple component of the first current and the ripple component of the second current on the basis of the first voltage and the second voltage detected by the first voltage detector and the second voltage detector, respectively.

9. The power converter according to claim 5, wherein the ripple component obtaining unit includes a first current detector that detects the first current and a second current detector that detects the second current, and determines the ripple component of the first current and the ripple component of the second current on the basis of the first current and the second current detected by the first current detector and the second current detector, respectively.

10. The power converter according to claim 5, wherein the controller controls the first output-side converter circuit and the second output-side converter circuit to generate the first adjusted current and the second adjusted current such that a current flowing across the positive-side capacitor between the positive node and the neutral node does not include the ripple component of the first current flowing from the positive terminal to the positive node or contains a substantially reduced amount of the ripple component of the first current, and such that a current flowing through the negative-side capacitor between the neutral node and the negative node does not include the ripple component of the second current flowing from the negative node to the negative terminal or contains a substantially reduced amount of the ripple component of the second current.

11. A power converter, comprising:
  an input-side converter circuit configured to receive an AC power input, the input-side converter including:
    a DC output terminal section having a positive terminal, a negative terminal, and a neutral terminal;
    a positive-side capacitor, one end of which is connected to the positive terminal through a positive node and another end of which is connected to the neutral terminal through a neutral node; and
    a negative-side capacitor, one end of which is connected to the neutral terminal through said neutral node and another end of which is connected to the negative terminal through a negative node;
  a first output-side converter circuit having first and second input terminals, the first input terminal being connected to the positive node and the second input terminal being connected to the neutral node, the first output-side converter circuit further having two output terminals, respectively connected to two main output terminals of the power converter;
  a second output-side converter circuit having first and second input terminals, the first input terminal being connected to the neutral node and the second input terminal being connected to the negative node so that the first and second input terminals of the first output-side converter circuit and the first and second input terminals of the second output-side converter circuit are connected in series, the second output-side converter circuit further having two output terminals, respectively connected to the two main output terminals of the power converter so that the two output terminals of the first output-side converter circuit and the two output terminals of the second output-side converter circuit are connected in parallel to each other; and
  a controller that controls the first output-side converter circuit and the second output-side converter circuit,
  wherein the controller controls the first output-side converter circuit such that a first adjusted current flows from the positive node to the first input terminal of the first output-side converter circuit, said first adjusted current having a ripple component corresponding to a ripple component of a first current that flows from the positive terminal to the positive node so that a current flowing across the positive-side capacitor between the positive node and the neutral node does not include the ripple component of the first current or contains a substantially reduced amount of the ripple component of the first current, and
  wherein the controller controls the second output-side converter circuit such that a second adjusted current flows from the second input terminal of the second output-side converter circuit to the negative node, said second adjusted current having a ripple component corresponding to a ripple component of a second current that flows from the negative node to the negative terminal so that a current flowing through the negative-side capacitor between the neutral node and the negative node does not include the ripple component of the second current or contains a substantially reduced amount of the ripple component of the second current.

* * * * *